(12) United States Patent
Jung et al.

(10) Patent No.: US 12,288,226 B2
(45) Date of Patent: Apr. 29, 2025

(54) METHOD, COMMUNICATION TERMINAL, AND COMPUTER-READABLE RECORDING MEDIUM FOR CONTROLLING HOME SCREEN OF COMMUNICATION TERMINAL

(71) Applicant: FIRSTFACE CO., LTD., Seoul (KR)

(72) Inventors: Jaelark Jung, Goyang (KR); Jaekyu Lee, Gunpo (KR)

(73) Assignee: FIRSTFACE CO., LTD., Seoul (KR)

( * ) Notice: Subject to any disclaimer, the term of this patent is extended or adjusted under 35 U.S.C. 154(b) by 0 days.

(21) Appl. No.: 18/124,509

(22) Filed: Mar. 21, 2023

(65) Prior Publication Data
US 2023/0230130 A1 Jul. 20, 2023

Related U.S. Application Data

(63) Continuation of application No. 16/908,509, filed on Jun. 22, 2020, now abandoned, which is a
(Continued)

(30) Foreign Application Priority Data

Sep. 26, 2013 (KR) .................. 10-2013-0114824
Sep. 26, 2013 (KR) .................. 10-2013-0114825
(Continued)

(51) Int. Cl.
*G06Q 30/0251* (2023.01)
*G06F 3/14* (2006.01)
(Continued)

(52) U.S. Cl.
CPC ......... *G06Q 30/0269* (2013.01); *G06Q 10/10* (2013.01); *G06Q 30/0267* (2013.01);
(Continued)

(58) Field of Classification Search
CPC ............... G06Q 30/0269; G06Q 10/10; G06Q 30/0267; H04W 4/80; G06F 3/14; G09G 2330/021
See application file for complete search history.

(56) References Cited

U.S. PATENT DOCUMENTS

2002/0086680 A1 7/2002 Hunzinger
2004/0023666 A1 2/2004 Moon et al.
(Continued)

FOREIGN PATENT DOCUMENTS

CN 1748436 A 3/2006
CN 101116100 A 1/2008
(Continued)

OTHER PUBLICATIONS

Roesner et al., "User-Driven Access Control: Rethinking Permission Granting in Modern Operating Systems" 2012 IEEE Symposium on Security and Privacy, pp. 224-238. (Year: 2012).*
(Continued)

*Primary Examiner* — Resha Desai
*Assistant Examiner* — Patrick Kim
(74) *Attorney, Agent, or Firm* — Stein IP, LLC (57) ABSTRACT

Home screen contents may be provided simultaneously while a communication terminal switches to an active mode from an inactive mode. The home screen contents correspond to an application installed in the communication terminal, and a user may set an application which desires the home screen contents to selectively receive the home screen contents.

4 Claims, 6 Drawing Sheets

Related U.S. Application Data continuation of application No. 15/025,024, filed as application No. PCT/KR2014/008920 on Sep. 24, 2014, now abandoned.

(30) Foreign Application Priority Data

| Sep. 26, 2013 | (KR) | 10-2013-0114826 |
| Jan. 2, 2014 | (KR) | 10-2014-0000484 |
| Jul. 18, 2014 | (KR) | 10-2014-0091351 |

(51) Int. Cl.
   *G06Q 10/10* (2023.01)
   *H04W 4/80* (2018.01)

(52) U.S. Cl.
   CPC ............... *H04W 4/80* (2018.02); *G06F 3/14* (2013.01); *G09G 2330/021* (2013.01)

(56) References Cited

U.S. PATENT DOCUMENTS

| | | | |
|---|---|---|---|
| 2005/0113115 A1 | 5/2005 | Haberman | |
| 2009/0006991 A1 | 1/2009 | Lindberg | |
| 2009/0055256 A1* | 2/2009 | Donahue | G06Q 30/0244 705/14.69 |
| 2011/0177773 A1 | 7/2011 | Rao | |
| 2012/0009896 A1* | 1/2012 | Bandyopadhyay | H04M 1/724631 715/764 |
| 2012/0079432 A1 | 3/2012 | Lee et al. | |
| 2012/0232994 A1 | 9/2012 | Kim et al. | |
| 2012/0276953 A1 | 11/2012 | Kim et al. | |
| 2012/0316940 A1 | 12/2012 | Moshfeghi | |
| 2013/0102363 A1 | 4/2013 | Jung et al. | |
| 2013/0210461 A1 | 8/2013 | Moldavsky | |
| 2014/0019253 A1* | 1/2014 | Ricasata | G06Q 30/0241 705/14.66 |
| 2015/0268819 A1* | 9/2015 | Smoak | G06F 3/04842 715/768 |

FOREIGN PATENT DOCUMENTS

| CN | 101164059 A | 4/2008 |
| CN | 101267522 A | 9/2008 |
| CN | 102572092 A | 7/2012 |
| EP | 2518678 A1 | 10/2012 |
| JP | 2001-266248 A | 9/2001 |
| JP | 2004-056551 A | 2/2004 |
| JP | 2007-199382 A | 8/2007 |
| JP | 2008-505401 A | 2/2008 |
| JP | 2008-518505 A | 5/2008 |
| JP | 2008-546075 A | 12/2008 |
| JP | 2009-070395 A | 4/2009 |
| JP | 2011-113279 A | 6/2011 |
| JP | 2011-124804 A | 6/2011 |
| JP | 2013-003625 A | 1/2013 |
| JP | 2013-050930 A | 3/2013 |
| JP | 2013-090107 A | 5/2013 |
| JP | 2013-114419 A | 6/2013 |
| JP | 2014-531616 A | 11/2014 |
| KR | 10-2004-0023923 A | 3/2004 |
| KR | 10-0794462 B1 | 1/2008 |
| KR | 10-2008-0086757 A | 9/2008 |
| KR | 10-2008-0092150 A | 10/2008 |
| KR | 10-0861656 B1 | 10/2008 |
| KR | 10-00900323 B1 | 5/2009 |
| KR | 10-0900323 B1 | 6/2009 |
| KR | 10-2010-0057461 A | 5/2010 |
| KR | 10-2010-0081086 A | 7/2010 |
| KR | 10-2011-0094843 A | 8/2011 |
| KR | 10-2012-0070360 A | 6/2012 |
| KR | 10-1160681 B1 | 6/2012 |
| KR | 10-2012-0134670 A | 12/2012 |
| KR | 10-2013-0045750 A | 5/2013 |
| KR | 10-2013-0088611 A | 8/2013 |
| TW | 201239764 A | 10/2012 |
| WO | WO 2008/093403 A1 | 8/2008 |
| WO | WO 2008/112401 A1 | 9/2008 |
| WO | WO 2010/084610 A1 | 7/2010 |
| WO | WO 2012/125566 A1 | 2/2012 |
| WO | WO 2013/036657 A2 | 3/2013 |

OTHER PUBLICATIONS

Office Action of corresponding Japanese Patent Application No. 2018-109289—15 pages (Dec. 3, 2019).
Office Action of corresponding Chinese Patent Application No. 201480053532.X—13 pages (Jan. 3, 2019).
Decision to Refuse a European Patent Application of corresponding European Application No. 14847433.1—16 pages (Mar. 26, 2019).
Extended European Search Report of corresponding European Application No. 19177954.5—8 pages (Jul. 22, 2019).
Office Action of corresponding Japanese Patent Application No. 2018-109289—13 pages (May 21, 2019).
Decision to Grant a Patent of corresponding Korean Patent Application No. 10-2018-0111854—1 page (Mar. 18, 2019).
European Search Report of corresponding Patent Application No. 14847433.1—9 pages (Jan. 25, 2017).
Office Action of corresponding European Patent Application No. 14847433.1—4 pages (Sep. 12, 2017).
Decision to Grant of correspond Japanese Patent Application No. 2016-544298—3 pages (Apr. 26, 2017).
Office Action of corresponding Japanese Patent Application No. 2016-544298—4 pages (May 24, 2018).
Office Action of corresponding Chinese Patent Application No. 201480053532.X 7 pages (May 18, 2018).
Decision of Grant of corresponding Korean Patent Application No. 10-2014-0091351 1 page (Apr. 26, 2016).
Office Action of corresponding Korean Patent Application No. 10-2014-0091351—2 pages (Dec. 11, 2015).
Decision to Grant of corresponding Korean Patent Application No. 10-2016-0087204—1 page (Jun. 22, 2017).
Office action of corresponding Korean Patent Application No. 10-2016-0087204—4 pages (Jan. 11, 2017).
Decision to Grant of corresponding Korean Patent Application No. 10-2017-0125052—1 page (Jun. 19, 2018).
Office Action of corresponding Korean Patent Application No. 10-2017-0125052—4 pages (Dec. 5, 2017).
International Search Report dated Jan. 13, 2015 of PCT/KR2014/008920 which is the parent application and its English translation—4 pages.
Office Action dated Feb. 12, 2014 of corresponding Korean Patent Application No. 10-2013-0114825—3 pages.
Notice of Allowance dated Apr. 18, 2014 of corresponding Korean Patent Application No. 10-2013-0114825—1 page.
Office Action dated Oct. 30, 2013 of corresponding Korean Patent Application No. 10-2013-0114825—4 pages.
Office Action dated Dec. 11, 2015 of corresponding Korean Patent Application No. 10-2014-0091351—2 pages.
Japanese Decision to Grant a Patent dated May 28, 2020, issued to Japanese Patent Application No. 2018-109289.
Office Action of corresponding European Patent Application No. 19177954.5 dated Mar. 2, 2022.
Office Action of corresponding Chinese Patent Application No. 201910745053.9 dated Jan. 6, 2022.
Summons to attend oral proceedings pursuant to Rule 115(1) EPC mailed Apr. 8, 2024, issued to European Application No. 19 177 954.5.

\* cited by examiner

METHOD, COMMUNICATION TERMINAL, AND COMPUTER-READABLE RECORDING MEDIUM FOR CONTROLLING HOME SCREEN OF COMMUNICATION TERMINAL

CROSS-REFERENCE TO RELATED APPLICATIONS

This application is a continuation of U.S. application Ser. No. 16/908,509, filed Jun. 22, 2020, which is a continuation of U.S. application Ser. No. 15/025,024, filed Mar. 25, 2016, which is a national stage of International Application No. PCT/KR2014/008920, filed Sep. 24, 2014, which claims the benefit of Korean Application No. 10-2013-0114824, filed Sep. 26, 2013, Korean Application No. 10-2013-0114825, filed Sep. 26, 2013, Korean Application No. 10-2013-0114826, filed Sep. 26, 2013, Korean Application No. 10-2014-0000484, filed Jan. 2, 2014, and Korean Application No. 10-2014-0091351, filed Jul. 18, 2014, in the Korean Intellectual Property Office, the disclosures of which are incorporated herein by reference.

TECHNICAL FIELD

The present disclosure relates to a method, a communication terminal, and a computer-readable recording medium for allowing a specific operation to be performed upon the activation of the communication terminal. The present disclosure enables a user to more easily manage the specific operation which is performed upon the activation of the communication terminal.

BACKGROUND TECHNOLOGY

Recently, various kinds of terminals such as, for example, smart phones, cellular phones, personal digital assistants (PDAs), web pads, laptops, and tablets, having not only communication functions but also various other functions, have come into wide use. These terminals have rapidly been accepted by users because not only can an environment identical or similar to a desktop computer be implemented anytime and anywhere on the above-described terminals, but they also include a telephone function. In addition, the communication terminal can perform appropriate functions of not only its preloaded applications installed by the manufacturer but also its applications downloaded from an on-line application market and installed by the user.

Meanwhile, if there is no external input to the communication terminal for a certain period of time, a display screen of the communication terminal is switched from an "ON" state to an "OFF" state to reduce the power consumption of the terminal. When a user touches the display screen of the terminal or presses a button on the terminal or when the user opens a display cover unit of the terminal, the display screen of the terminal is re-switched from the "OFF" state to an "ON" state, at which time, the display screen generally provides basic information such as current time and a standby screen on which the user can unlock the terminal.

Technical Problem

Accordingly, it is an object of the present disclosure to execute a specific application at the time of the activation of a communication terminal.

Another object of the present disclosure is to allow a user to select and set a specific application to be executed at the time of the activation of a communication terminal.

Still another object of the present disclosure is to execute an application selected by a user at the time of the activation of a communication terminal and provide an advertisement that suits a taste of the user through the execution of the application.

Technical Solution

In accordance with one embodiment of the present disclosure, there is provided a communication terminal having one or more applications installed thereon, the communication terminal including: a communication unit for receiving home screen data: a display unit; a home screen control unit for determining the home screen data which is to be outputted to the display unit; and a home screen execution unit for outputting a home screen content included in the determined home screen data to the display unit simultaneously with the switching of the display unit from an inactive mode to an active mode.

In addition, the home screen control unit may determine the home screen data to be outputted to the display unit through at least one selected from among identification code confirmation, pre-approval code confirmation, and priority confirmation. In addition, the home screen data may include a transmission identification code for allowing the home screen control unit to perform the determination of the home screen data, and the identification code confirmation of the home screen control unit may be confirmation of an application including a reception identification code corresponding to the transmission identification code of the home screen data.

In addition, the communication terminal may further include a pre-approval code management unit for confirming and managing the pre-approval codes for one or more applications installed on the communication terminal. In addition, the pre-approval code confirmation of the home screen control unit may be confirmation of the pre-approval codes for one or more applications installed on the communication terminal, and the pre-approval codes may be set at the time of installing the one or more applications or in the middle of executing the one or more applications.

In addition, the priority confirmation of the home screen control unit may include determination of an output order of the home screen data.

In addition, the communication terminal may further include an activation detection unit for detecting the switching of the communication terminal from an inactive mode to an active mode, and the priority confirmation of the home screen control unit may include determination of an output order of the home screen data based on the activation detection time of the activation detection unit.

In addition, the communication terminal may further include a home screen data repository for storing the home screen data.

In accordance with another embodiment of the present disclosure, there is provided a method for controlling one or more home screen data, the method including the steps of: receiving one or more home screen data; determining home screen data to be outputted to a display unit among the one or more home screen data; and outputting a home screen content included in the determined home screen data to the display unit simultaneously with the switching of the display unit from an inactive mode to an active mode.

The step of determining home screen data may be performed through at least one selected from among identification code confirmation, pre-approval code confirmation, and priority confirmation. In addition, the home screen data may include a transmission identification code for determination of the home screen data, and the identification code confirmation may include confirmation of an application including a reception identification code corresponding to the transmission identification code of the home screen data.

In addition, the method may further include a step of managing pre-approval codes of one or more applications, and the pre-approval code confirmation may be confirmation of the pre-approval code set in the step of managing the pre-approval codes. The step of managing the pre-approval codes may include a step of displaying one or more applications installed on the terminal of a user; and a step of receiving the setting of pre-approval of the displayed one or more applications.

Besides, the step of managing the pre-approval codes may include receiving the setting of pre-approval of the displayed one or more applications at the time of installing the one or more applications or in the middle of executing the one or more applications.

In addition, the priority confirmation may include determination of an output order of the home screen data.

In addition, the method may further include an activation detection step for detecting the switching of the display unit from an inactive mode to an active mode, and the priority confirmation may include determination of an output order of the home screen data based on the activation detection time in the activation detection step.

In accordance with another embodiment of the present disclosure, there is provided a computer-readable recording medium having recorded thereon the above-described method for controlling home screen data.

In accordance with another embodiment of the present disclosure, there is provided a method for providing a home screen using an application installed on a communication terminal, the method including the steps of: receiving home screen data through the communication terminal; determining whether to output the home screen data through at least one selected from among a step of confirming whether or not the received home screen data corresponds to the application installed on the communication terminal, a step of confirming a pre-approval code of the application installed on the communication terminal, and a step of confirming a priority of the application installed on the communication terminal; and outputting a home screen content included in the determined home screen data to a display unit of the communication terminal simultaneously with the switching of the display unit from an inactive mode to an active mode.

In addition, the step of confirming whether or not the received home screen data corresponds to the application installed on the communication terminal may include confirming whether or not a transmission identification code included in the home screen data corresponds to a reception identification code included in the application installed on the communication terminal.

In addition, the method may further include a step of allowing a user to set the pre-approval code of the application installed on the communication terminal.

In addition, the setting of the pre-approval code may be made at the time of installing or in the middle of executing the application installed on the communication terminal.

The step of confirming priority of the application installed on the communication terminal may include determining an output order of the home screen data.

In addition, the method may further include an activation detection step of detecting the switching from an inactive mode to an active mode, and the step of confirming a priority of the application installed on the communication terminal may include determining an output order of the home screen data based on the activation detection time through the activation detection step.

In addition, the home screen content outputted to the display unit simultaneously with the switching from an inactive mode to an active mode may include a link tab for allowing access to additional information, and the home screen content outputted to the display unit simultaneously with the switching from the inactive mode to the active mode may include a skip tab for allowing entry into a standby screen. In addition, the home screen contents may include both the link tab and the skip tab.

In addition, the home screen data may be transmitted to the communication terminal from a server for the application installed on the communication terminal.

In accordance with another embodiment of the present disclosure, there is provided a mobile advertisement method using an application installed on a communication terminal of a user, the method including the steps of: receiving mobile advertisement data through the communication terminal; determining whether to output the mobile advertisement data through at least one selected from among a step of confirming whether or not the received mobile advertisement data corresponds to the application installed on the communication terminal, a step of confirming a pre-approval code of the application installed on the communication terminal, and a step of confirming a priority of the application installed on the communication terminal; and outputting an advertisement screen included in the determined mobile advertisement data to a display unit of the communication terminal simultaneously with the switching of the display unit of the communication terminal from an inactive mode to an active mode.

In addition, the step of confirming whether or not the received mobile advertisement data corresponds to the application installed on the communication terminal may include confirming whether or not a transmission identification code included in the mobile advertisement data corresponds to a reception identification code included in the application installed on the communication terminal.

In addition, the method may further include a step of allowing the user to set the pre-approval code of the application installed on the communication terminal, and the setting of the pre-approval code may be made at the time of installing or in the middle of executing the application installed on the communication terminal.

In addition, the step of confirming a priority of the application installed on the communication terminal may include determining an output order of the advertisement screen.

In addition, the method may further include an activation detection step of detecting the switching from the inactive mode to the active mode, and the step of confirming a priority of the application installed on the communication terminal may include determining an output order of the advertisement screen based on the activation detection time through the activation detection step.

In addition, the advertisement screen outputted to the display unit simultaneously with the switching from the inactive mode to the active mode may include a link tab for allowing access to additional information, a skip tab for allowing entry into a standby screen, or both link tab and skip tab.

In addition, the mobile advertisement data may be transmitted to the communication terminal of the user from a server for the application installed on the communication terminal.

Advantageous Effect

In accordance with the present disclosure as constructed above, various operations can be performed simultaneously with the switching of the communication terminal from the inactive state to the active state.

In addition, a user can set an application suiting his or her taste so that the user can be provided with the application running when the communication terminal is switched from the inactive state to the active state, or with related information.

BRIEF DESCRIPTION OF THE DRAWINGS

The above objects, other features and advantages of the present disclosure will become more apparent by describing the embodiments thereof with reference to the accompanying drawings, in which.

EMBODIMENTS OF THE INVENTION

The present disclosure will be described with reference to the accompanying drawings based on an embodiment in which the present disclosure may be carried out as an example. The embodiments will be sufficiently described in detail so that those skilled in the art may carry out the present disclosure. It should be understood that various embodiments of the present disclosure are different from each other, but need not be mutually exclusive. For example, a specific figure, a structure, and a characteristic described herein may be implemented as another embodiment without departing from a spirit and a scope of the present disclosure in relation to an embodiment. Further, it should be understood that a position or a displacement of an individual constituent element in each disclosed embodiment may be changed without departing from the spirit and the scope of the present disclosure. Accordingly, a detailed description below should not be taken as a limited meaning, and will be defined by the accompanying claims together with all equivalent scopes to the claims if the scope of the present disclosure is appropriately described.

Hereinafter, embodiments of the present disclosure will be described in detail with reference to the accompanying drawings so that the present disclosure can be easily carried out by a person of ordinary skill in the art to which the present disclosure pertains.

The term "communication terminal" used herein refers to a digital device that includes a memory means and a microprocessor with computing capability as in a mobile phone, a navigation system, a web pad, a PDA, a workstation, a personal computer (for example, a laptop computer or the like) as a digital device including wired/wireless communication functions or other functions. Although an example of the communication terminal (for example, a mobile phone) will be described in part of this specification, the communication terminal in the present disclosure is not limited thereto.

The term "inactive state" used herein refers to a state in which the communication terminal is communicable but a display screen is turned off. Although the display screen is in an "off" state, a given function (e.g., a music playback function or the like) is operable. As described above, the term "inactive state" used herein refers to a concept encompassing states in which the display screen is turned off, regardless of whether or not the communication terminal performs a predetermined operation. However, a state in which the communication terminal is completely turned off is excluded.

The term "active state" used herein refers to a state in which the display screen of the communication terminal is turned on. Switching from the "inactive state" to the "active state" refers to switching of the display screen from the "OFF" state to the "ON" state, regardless of information displayed on the display screen in the "ON" state. For example, the communication terminal can be determined to be in the "active state" even when only a lock screen is displayed. In addition, the switching of the display screen from the inactive state to the active state may be implemented in such a way by pressing a button, touching the screen, or opening a cover for a display unit. Further, a lock screen may be implemented by a fingerprint recognition technique using a terminal button.

The term, "home screen" used herein refers to a specific screen displayed on a display unit when the display state of the display screen of the communication terminal is switched from the inactive state to the active state according to an embodiment of the specification. The home screen is distinguished from a standby screen in which the mobile terminal is in a lock mode or a use standby state. In addition, the home screen may comprise the lock mode screen. For example, the home screen may be displayed when an unlock command is inputted, or the lock screen may be displayed after a link tab or a skip tab is selected. Alternatively, the unlock screen and the home screen may be simultaneously displayed on the same screen.

Figure 1:
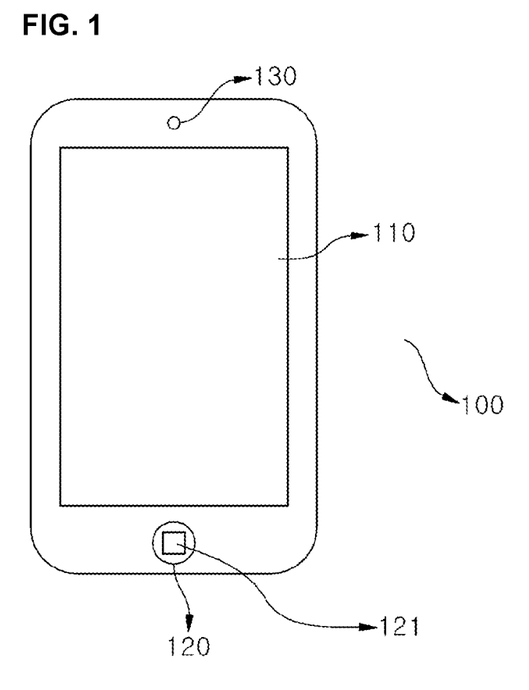
FIG. 1 is a diagram showing an outer appearance of a communication terminal in accordance with an embodiment of the present disclosure.

FIG. 1 is a diagram showing an external appearance of the communication terminal in accordance with an embodiment of the present disclosure.

Referring to FIG. 1, a communication terminal 100 according to this embodiment can include a display unit 110 and an activation button 120. In addition, the communication terminal 100 can further include a camera 130.

Although it has been illustrated in FIG. 1 that the display unit 110 is provided on the entire surface of a frame constituting the communicating terminal 100, the activation button 120 is provided on a lower part of the display unit 110, and the camera 130 is provided on an upper part of the display unit 110, these elements may be configured in different forms. For example, the display unit 110 needs not necessarily be formed on the entire surface of the communication terminal 100. In other words, the display unit 110 may be formed on at least a part of the surface of the communication terminal 100, and the activation button 120 may be formed on a part different from that of the display unit 10. In addition, the camera 130 may be formed on the other side on which the display unit 110 is not provided in the communication terminal 100.

The display unit 110 displays various information regarding the operation states of the communication terminal 100, and also displays an interface for a user's input if the communication terminal 100 drives a touch screen. In general, if a state in which the user's operation on the communication terminal 100 is absent continues for a predetermined period of time, the communication terminal 100 is in the inactive state. The user's operation refers to an input through the interface displayed on the display unit 110, an operation through the button 120, or an operation through a function key (e.g., a volume control key or the like). A condition in which the inactive state is reached can be set by the user. For example, the condition can be set using a setting menu through the interface displayed on the display unit 110. On the other hand, the state can be switched to the inactive state by pressing another button (e.g., an ON/OFF button) provided on the communication terminal 100. For example, the communication terminal 100 can be completely turned off if the ON/OFF button is pressed for a long time when the communication terminal 100 is in the active state, but the communication terminal 100 can be in the inactive state as a communicable state in which a phone can be received if the ON/OFF button is pressed for a short time.

The activation button 120 is a means for switching the communication terminal from the inactive state to the active state. In other words, if the user presses the activation button 120 when the communication terminal 100 is in the inactive state, switching to the active state is performed.

Figure 2:
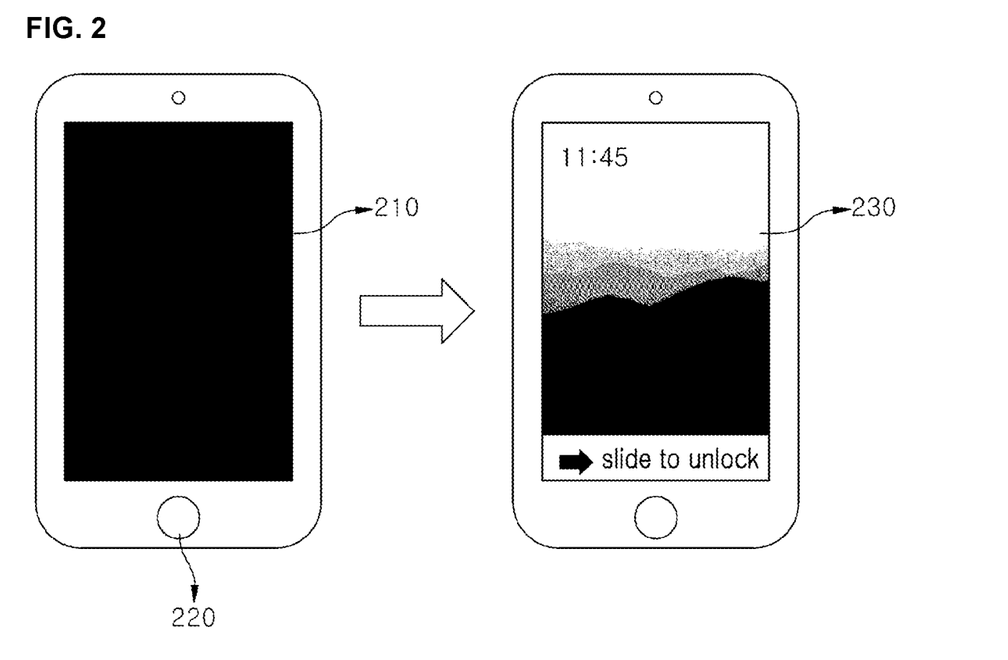
FIG. 2 is a diagram showing the operation of a conventional communication terminal in the case where an activation button is pressed.

FIG. 2 illustrates a state in which a standby screen 230 is displayed on the display unit 110 after pressing the activation button 220 when the communication terminal is in the inactive state 210. The standby screen can provide information such as current date and time, etc., and may further provide an unlock interface. However, the activation button 220 may function as a means for performing another operation (e.g., a means for moving to a standby screen while a certain operation state is displayed on the display unit 110 or a means for displaying a list of programs currently being operated).

In accordance with an embodiment of the present disclosure, if the user presses the activation button when the communication terminal is in the inactive state, the communication terminal performs a predetermined operation instead of merely switching to the active state.

When the communication terminal 100 is in the inactive state, the user can set an operation to be performed by pressing the activation button 120. For example, an operation of the communication terminal 100 connected to the activation button 120 can be set using a setting menu through the interface displayed on the display unit 110. In addition, in accordance with an embodiment of the present disclosure, an operation which differs according to the number of presses or a press time of the activation button 120 can be performed when the communication terminal 100 is in the inactive state. For example, a first operation can be set to be performed if the activation button 120 is pressed once, and a second operation can be set to be performed if the activation button 120 is continuously pressed three times. In addition, as another example, the first operation can be set to be performed if the activation button 120 is pressed once for a short time, and the second operation can be set to be performed if the activation button 120 is pressed once for a long time. The communication terminal 100 may include a predetermined clock circuit or timer to calculate the cumulative number of continuous presses of the activation button 120 and measure a period of time for which the activation button 120 is pressed. For example, the number of presses is determined to be two if the activation button 120 is re-pressed within a threshold time after one press. If the activation button 120 is pressed for the threshold time or more, a long press of the activation button 120 can be determined.

In accordance with an embodiment of the present disclosure, a sub-display unit 121 can be provided on the activation button 120. Information regarding an operation to be performed by pressing the activation button 120 can be displayed on the sub-display unit 121. Various types such as a shape, a character, a graphic, and color can be displayed. When the display type is a shape, such as a circle, a triangle, a rectangle, a hexagon, or the like, it can be displayed on the sub-display unit 121. For example, a circle can be displayed on the sub-display unit 121 when the first operation is set to be performed by pressing the activation button 120, and a triangle can be displayed on the sub-display unit 121 when the second operation is set to be performed by pressing the activation button 120, and vice versa. A display type of the sub-display unit 121 and a correspondence relationship between operations and displays can also be set by the user. For example, the user can select the first operation as the operation to be performed by pressing the activation button 120 from a setting menu and select the triangle as the display type of the sub-display unit 121 of the activation button 120. Accordingly, the user can recognize that the first operation is performed when the user has pressed the activation button 120 because a triangle is displayed on the sub-display unit 121 even when the communication terminal 100 is in the inactive state.

Although the sub-display unit 121 can be implemented by a general display such as an LCD, or an LED, the present disclosure is not limited thereto.

An operation of controlling driving of the display unit 110 and the sub-display unit 121 can be performed in the same way by the same processor or in different ways by different processors.

Figure 3:
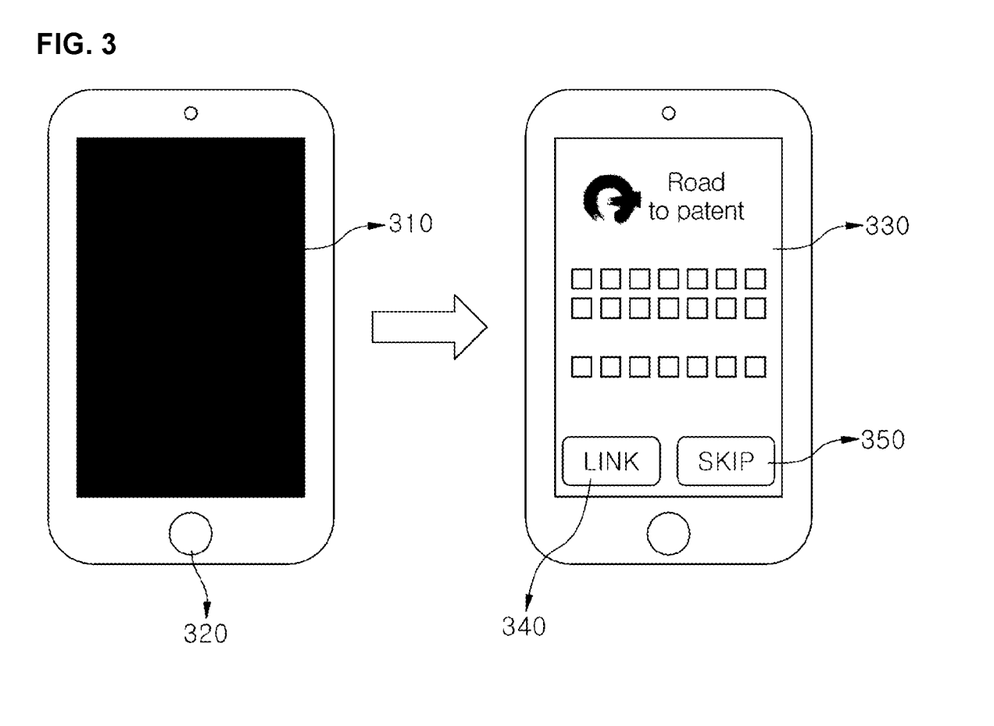
FIG. 3 is a diagram showing an example of the operation of a communication terminal when an activation button is pressed in accordance with an embodiment of the present disclosure.

Hereinafter, an example of the operation of a communication terminal will be described with reference to FIG. 3.

In this embodiment, when the display unit is switched from the "OFF" state 310 to the "ON" state, a specific application runs immediately. In particular, a screen provided by the running of the application is referred to as a "home screen" 330. The home screen can provide various kinds of information. For example, the home screen can provide product advertisement, news, events, etc. A user may select a link tab 340 provided on the home screen 330 to enter a step for more detailed information, or may select a skip tab 350 provided on the home screen 330 to move to a standby screen. In addition, the home screen may be the execution of the application itself. A program for providing the home screen may be preinstalled by the manufacturer of the communication terminal or separately downloaded and installed by the user. In addition, the home screen may be provided after a user authentication. For example, the home screen may be provided after the completion of the user authentications for unlocking a lock screen, such as the input of a password, the input of an unlock pattern, fingerprint recognition, iris recognition, and facial recognition or the like. In this case, the home screen may be provided without a separate additional input operation after the completion of the user authentication. Thus, the user can be provided with the home screen simultaneously with the user authentication. In addition, the home screen and the user authentication may be provided simultaneously with the switching of the display unit from the "OFF" state to the "ON" state. In other words, the user may execute the user authentication and the home screen without an additional input operation through a one-time input when the display unit is in the "OFF" state.

More specifically, the home screen may be executed through the execution of an application installed on the communication terminal, the execution of a separate home screen provided by an application installed on the communication terminal, or the operation of a separate home screen output unit. For example, the home screen may be the execution of the installed application itself. That is, the home screen may be the same as that of the application running on the standby screen according to the user's input. In this case, when the user presses the activation button, a specific application itself can be executed immediately without any additional input operation.

Further, the running of an application may be an execution of a separate home screen which is distinct from the direct running of the application itself. In other words, the application can provide a separate home screen which is distinct from the running of the application itself, upon the activation of the display.

In addition, the provision of the home screen may be made through a home screen management unit that integratedly manages home screen data. For example, in the case where a plurality of applications is installed on a single communication terminal, the home screen management unit can output the home screen determined by a control unit to the display unit. In other words, the output process of the home screen can be performed through the home screen management unit, not through the application corresponding to the home screen whose output is determined. Therefore, although the provision of the home screen is made through each application installed on the communication terminal, the output of the home screen can be performed through the single home screen management unit. Furthermore, the home screen management unit may provide a home screen management screen that allows a user to set or release an application which is to be outputted to the home screen. Thus, the user can control the home screen more easily, and the home screen can be managed and outputted through a single program. The home screen management unit may be provided through an application separately installed on the communication terminal, or may be pre-installed by the manufacturer of the communication terminal.

In addition, the user can skip the home screen according to a pressing method of the activation button. In other words, the activation button may be implemented to perform a plurality of operations depending on the number of presses or the time when the activation button is pressed, through which the move to the home screen can be controlled. For example, when the activation button is pressed for a short period of time in the inactive mode, the display may be moved to the home screen, and when the activation button is pressed for a long period of time in the inactive mode, the display may be moved to the standby screen while skipping the home screen.

The user can easily acquire various kinds of information provided on the home screen 330 through the activation button 320 pressed habitually, and an information or advertisement provider can expose his or her information or advertisement to the user more easily. More specifically, when a home screen provider receives a request for an advertisement from an advertiser, it transmits home screen data to the user's communication terminal through a server. The user's communication terminal is switched from the inactive state to the active state, and at the same time outputs the home screen data transmitted thereto from the home screen provider to the display unit.

The home screen can provide various kinds of information. For example, a social commerce application can provide information on new products or specific product events. An application for a sports game or an art performance guide can provide information on various kinds of such events to the home screen. A game application can provide new update information or information on a game newly released on the market. Thus, the user can receive his or her preferred information to the home screen through the control of the home screen, and the application provider can provide desired information to the user more easily. The application provider may provide data for the construction of a separate home screen, or may provide the execution of the application itself to the home screen.

Figure 4:
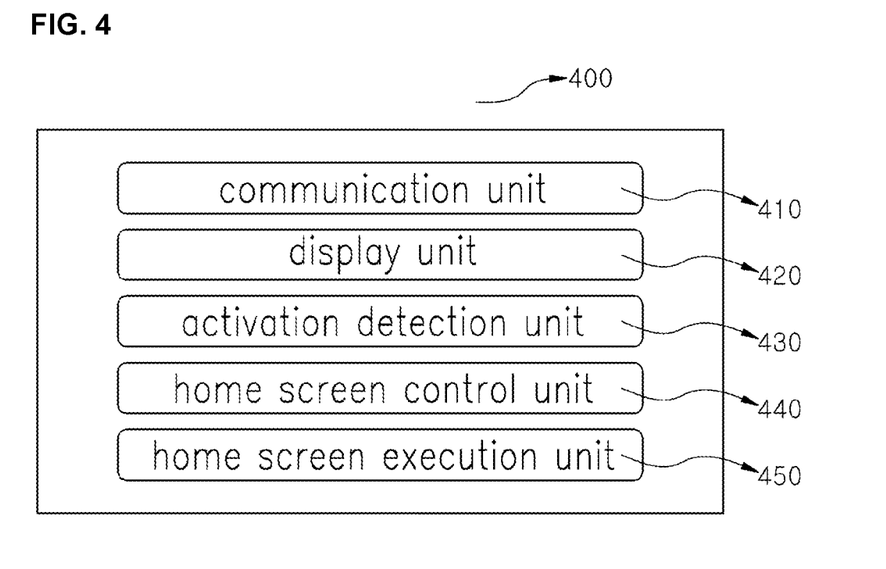
FIG. 4 is a functional block diagram showing the configuration of a communication terminal in accordance with an embodiment of the present disclosure.

Hereinafter, a first embodiment of the present disclosure will be described more in detail with reference to FIG. 4. The first embodiment of the present disclosure provides a communication terminal 400 that provides home screen data.

The communication terminal 400 includes a communication unit 410, a display unit 420, an activation detection unit 430, a home screen control unit 440, and a home screen execution unit 450. When the communication terminal 400 is switched from the inactive state to the active state, the display unit 420 is switched to the "ON" mode and the activation detection unit 430 recognizes the active state. When the activation detection unit 430 recognizes the active state, the home screen control unit 440 determines whether to execute a home screen based on an analysis of home screen data, and the home screen execution unit 450 activates the display unit 420 and at the same time executes the home screen based on the determination of the home screen control unit 440. In addition, the home screen control unit 440 can perform the analysis of the home screen prior to detecting the activation to execute the home screen along with the activation upon the detection of the activation.

The home screen control unit 440 controls whether to display the home screen and the order of the display, and the like by analyzing the home screen data. More specifically, the home screen control unit may perform an analysis of at least one selected from among reception identification code confirmation, pre-approval code confirmation, and priority confirmation, but not limited thereto, and may perform an additional analysis. For example, the home screen control unit 440 may determine home screen data desired to be outputted among a plurality of home screen data received, an output order, and the like.

The home screen data received by the communication terminal includes a home screen content and a transmission identification code. The home screen content includes information which is to be displayed on the home screen of the communication terminal, and the transmission identification code allows confirmation of whether or not a corresponding application is installed on the communication terminal in response to a reception identification code of an application installed on the communication terminal. For example, the home screen control unit 440 may not allow the home screen data received by the communication terminal to be executed if the reception identification code corresponding to the transmission identification code of the received home screen data is not confirmed.

In addition, an application provider directly transmits the home screen data including the transmission identification code corresponding to the reception identification code of the application through a server thereof so that the home screen data can be outputted to the home screen of the communication terminal of the user. Thus, the application provider may directly provide information to the user through the application. Moreover, the application provider may not directly provide the home screen data through the server thereof, but indirectly provide the home screen data using a function provided by another application.

The pre-approval code confirmation allows the user of the communication terminal to confirm an application for executing the home screen data among the applications installed on the user's terminal. For example, the user can set an application for which he output of the home screen has been pre-approved, among the applications whose reception identification code has been confirmed, i.e., those installed on the communication terminal. Accordingly, the user can display only the home screen data for an application preferred by the user among the applications installed on the communication terminal. In addition, the transmission identification code and the reception identification code are not limited to corresponding to each other in a one-to-one manner. For example, a plurality of home screen data may include a transmission identification code corresponding to a reception identification code of a single application.

Figure 5:
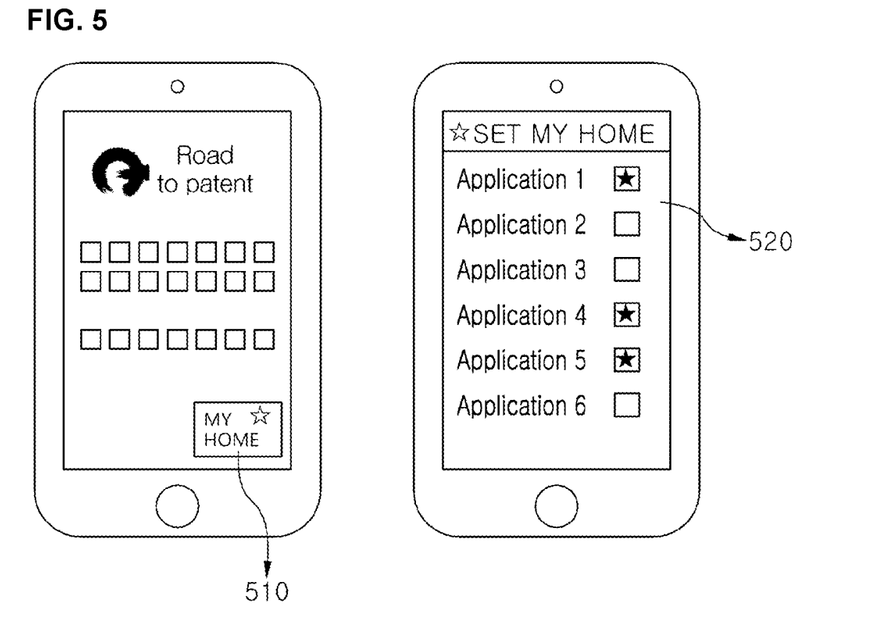
FIG. 5 is a diagram showing an example of the operation for selecting applications to be displayed on a home screen.

Referring to FIG. 5, the user may agree with the provision of a home screen either through pre-approval upon the installation of an application, or through the use of a home screen selection tab 510 provided on the screen on which the application is executed. In other words, the user can be provided with information of an application through the home screen by selecting the application if the application is agreed to during the implementation of the application. In addition, the user can integratedly manage whether or not a plurality of applications executes the home screen through a separate home screen management application 520. A home screen management program allows the selection of information on the applications installed on the communication terminal and whether to set a home screen for each application. Thus, the user can set the home screen for the plurality of applications more easily. Further, the communication terminal may include a pre-approval code management unit so that the user can manage pre-approval codes for the plurality of applications. In addition, the home screen management application 520 may execute the output of the home screen content determined. In other words, the application that is set upon the activation of the display unit does not output the home screen directly, but the home screen management application 520 may output the home screen set under the integrated control thereof. Thus, the execution of the output of the home screen upon the activation of the display unit can be simplified by the home screen management application 520.

The confirmation of a priority will be described hereinafter. If a plurality of applications is designated to the home screen, the output of the home screen may be determined by various algorithms. For example, the user may previously establish priorities of the applications and determine the home screen based on the priorities of the applications. Alternatively, the user may determine the home screen sequentially or randomly. In addition, the priorities of the applications may be established depending on the utilization of the applications, for example, the number times when the applications are executed for a predetermined time period. In addition, the application may establish priorities of the applications. For example, each of the applications may establish priorities of the applications for the time zone when the terminal is activated so that the application having the priority at a corresponding time zone can have the priority to construct the home screen. Also, the priorities of the applications may be determined by using data based on the utilization of the home screen, for example, the percentage of the utilization of information by the user through a link on the home screen. The establishment of the priorities of the applications can apply various algorithms depending on utilization purpose and implementation easiness, but is not limited to the above embodiment. In addition, the priorities of the applications may be determined depending on the time when the activation detection unit detects the activation of the display unit. For example, each home screen data or each application can set a preference for the output time of the home screen. Thus, when the activation of the display unit is detected at the preferred time, the home screen corresponding to the application with the preference for that time can have a priority so as to be outputted to the display unit. In addition, a plurality of home screen contents may be outputted to a single screen. In this case, a difference may be made to the size of the screen to which the home screen contents are outputted depending on the priority.

In addition, the communication terminal may further include a content repository that stores the home screen content. The content repository temporarily stores the home screen content of the home screen data. When the home screen control unit determines the output of the home screen content, the home screen execution unit can execute the home screen content stored in the content repository.

The home screen control unit determines a home screen content, which are to be outputted upon the switching of the display unit from the inactive mode to the active mode, from the home screen data received by the communication terminal through the reception identification code confirmation, the pre-approval code confirmation, and the priority confirmation, and the home screen execution unit 450 outputs the home screen content determined upon the switching of display unit from the inactive mode to the active mode. The operation of the home screen control unit is not limited thereto, but the home screen control unit may perform only a part of the reception identification code confirmation, the pre-approval code confirmation, and the priority confirmation or may perform an additional analysis.

Figure 6:
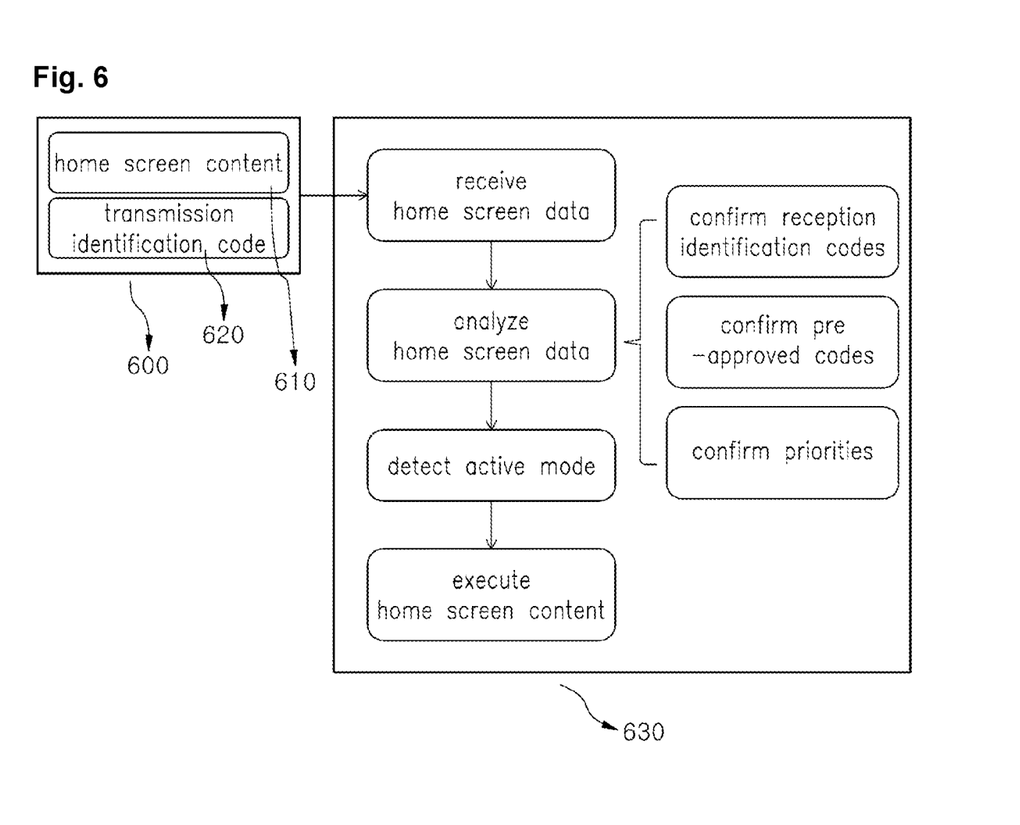
FIG. 6 is a functional block diagram showing a home screen data provision method in accordance with an embodiment of the present disclosure.

A second embodiment of the present disclosure will be described hereinafter with reference to FIG. 6. The second embodiment of the present disclosure provides a method for providing home screen data using an application, i.e., a method for outputting home screen data to a home screen through the reception and analysis of the home screen data provided by an application server.

The application server can transmit home screen data 600 to a user communication terminal 630. The home screen data 600 can include a home screen content 610 and a transmission identification code 620. The user communication terminal 630 receives the home screen data from the application server, and analyzes the received home screen data. An application installed on the user communication terminal 630 includes a reception identification code corresponding to a transmission identification code of the home screen data so that the user can confirm whether or not a corresponding application is installed on the communication terminal 630 based on the reception identification code and the transmission identification code. If a reception identification code corresponding to the transmission identification code of the home screen data is not confirmed, the communication terminal may reject reception of the home screen data, delete the received home screen data or reject or defer execution of the home screen data. In addition, the transmission identification code and the reception identification code are not limited to corresponding to each other in a one-to-one manner. For example, a plurality of home screen data may include a transmission identification code corresponding to a single application.

In addition, an application provider directly transmits the home screen data including the transmission identification code corresponding to the reception identification code of the application through a server thereof so that the home screen data can be outputted to the home screen of the communication terminal of the user. Thus, the application provider may directly provide information to the user through the application. Moreover, the application provider may not directly provide the home screen data through the server thereof, but indirectly provide the home screen data using a function provided by another application.

If the reception identification code is confirmed, the pre-approval code management unit can confirm a pre-approval code for an application including the reception identification code. The pre-approval code is a code that is determined by the user whether to approve or to reject reception of the home screen data from the application server. If the approval is confirmed, a home screen content of the home screen data can be outputted. The priority confirmation code is a step in which when a plurality of home screen contents is in a standby state, the execution priorities of the home screen contents are confirmed. In this step, the user previously establishes priorities of the applications, and the home screen may be determined either based on the priorities of the applications or in a sequential or random manner. In addition, the priorities of the applications may be established depending on the utilization of the applications, for example, the number of times when the applications are executed for a predetermined time period. In addition, the application may establish the priorities of the applications. For example, each of the applications may establish priorities of the applications for the time zone when the terminal is activated so that the application having the priority at a corresponding time zone can have the priority to construct the home screen.

In addition, the priorities of the applications may be determined depending on the time when the activation detection unit detects the activation of the display unit. For example, each home screen data or each application can set a preference for the output time of the home screen. Thus, when the activation of the display unit is detected at the preferred time, the home screen corresponding to the application with the preference for that time can have a priority so as to be outputted to the display unit. Also, the priorities of the applications may be determined by using data based on the utilization of the home screen, for example, the percentage of the utilization of information by the user through a link on the home screen. The establishment of the priorities of the applications can apply various algorithms depending on utilization purpose and implementation easiness, but is not limited to the above embodiment.

In addition, a plurality of home screen contents may be outputted to a single home screen. In this case, a difference may be made to the size of the screen to which the home screen contents are outputted depending on the priority.

If it is determined whether or not the home screen content is outputted based on an analysis of the home screen data, the activation detection unit detects whether or not the communication terminal is in an active mode. In other words, when the display state of the communication terminal is switched from the "OFF" state to the "ON" state, the activation detection unit detects that the communication terminal is in an active mode, and at the same time the home screen execution unit can execute the home screen content determined based on the analysis of the home screen data.

The active mode detection may be performed after the reception and analysis of the home screen data, but is not limited thereto, and it may be performed before or simultaneously with the reception and analysis of the home screen data. For example, when the active mode of the communication terminal is detected, the home screen content may be determined and outputted to the display unit through the reception and analysis of the home screen data.

In addition, the analysis and execution of the home screen data may be implemented through an application or a program separately installed on the user communication terminal. For example, the user communication terminal may include a separate home screen control program so that the home screen control program can collect and manage identification codes, pre-approval codes, and priorities of applications installed on the communication terminal, and can determine whether to execute the home screen content of the home screen data received by the communication terminal based on the identification codes, pre-approval codes, and priorities of applications which are collected and managed.

Further, the analysis and execution of the home screen data may be implemented through an application provided by an application server and installed on the user communication terminal. For example, the home screen control unit determines whether or not the home screen data received by the communication terminal is the home screen data including a transmission identification code corresponding to the reception identification code of the application through the application installed on the user communication terminal. If it is determined that the transmission identification code corresponds to the reception identification code, the home screen control unit may confirm a pre-approval code and a priority of the application, and then execute the corresponding home screen content when it is detected that the communication terminal is in an active mode.

A third embodiment of the present disclosure provides a mobile advertisement method using an application installed on a communication terminal.

An application provider can directly provide a mobile advertisement to a user using an application installed on the user communication terminal. The application provider can transmit advertisement data to the application installed on the communication terminal through an application server, and the installed application can confirm the corresponding advertisement data through a transmission identification code included in the advertisement data. In addition, a user can set a pre-approval code for each application installed on the communication terminal so that the user can be prevented from being exposed to an indiscriminate advertisement, and thus the user can selectively use only a desired advertisement. If a reception identification code and a pre-approval code corresponding to the transmission identification code included in the advertisement data are confirmed, the communication terminal can be switched from the inactive mode to the active mode, and at the same time the advertisement data can be outputted to the display unit.

In addition, the application provider directly transmits home screen data including the transmission identification code corresponding to the reception identification code of the corresponding application to a communication terminal of a user through a server thereof so that the home screen data can be outputted to a home screen of the communication terminal of the user. Thus, the application provider may directly provide information to the user through the corresponding application. Moreover, the application provider may not directly provide the home screen data to the user through the server thereof, but indirectly provide the home screen data using a function provided by another application.

If a plurality of advertisement data for a plurality of applications is received by the communication terminal, the advertisement data to be outputted to the display unit may be determined through an algorithm for determining a priority. In addition, a plurality of home screen contents may be outputted to a single screen. In this case, a difference may be made to the size of the screen to which the home screen contents are outputted depending on the priority.

Hereinafter, another embodiment of the present disclosure will be described.

In this embodiment, different applications may be executed upon the activation of the mobile communication terminal based on the current position information of the mobile communication terminal. The position information of the mobile communication terminal may be acquired from the GPS information of the mobile communication terminal, and may be confirmed through the communication with a periphery communication device. For example, if a user who carries a mobile communication terminal approaches a specific area, a communication device installed in the area can transmit a signal to the mobile communication terminal of the user so as to identify the presence of the mobile communication terminal. In other words, the communication device in the area transmits the signal to the mobile communication terminal using short distance communication such as, for example, NFC, Bluetooth, Beacon, WiFi or the like. When the mobile communication terminal of the user enters the reception coverage of the signal, the communication device in the area can identify the position of the mobile communication terminal. In this case, the communication between the mobile communication terminal and the communication device may be two-way communication in which both parties transmit and receive the signal between them, but is not limited thereto, and may be one-way communication in which the mobile communication terminal transmits the signal to the communication device, or vice-versa. If the mobile communication terminal of the user is determined to output a home screen based on the received signal, the mobile communication terminal can output the home screen to the display unit based on the signal upon the activation thereof.

Specifically, the communication device in the area sends out a signal within a certain range. If the mobile communication terminal enters the range, the communication device can identify the presence of the mobile communication terminal. If the mobile communication terminal is activated in the area, it determines whether to provide a home screen based on the signal received from the communication device so that the mobile communication terminal can provide the home screen according to the determination. The activation of the mobile communication terminal and the determination of whether to provide the home screen based on the signal received from the communication device is not limited to the order of the activation and the determination, and the activation and the determination may be performed simultaneously. The determination of whether to provide the home screen based on the signal received from the communication device can be made through at least one selected from a step of confirming whether or not the received signal corresponds to an application installed on the mobile communication terminal, a step of confirming a pre-approval code of the application and a step of confirming a priority of the application. For example, only in the case where the application corresponding to the communication device is installed on the mobile communication terminal, the home screen based on the received signal can be provided. In this case, the application may be a separate application associated with the communication device in the area, but is not limited thereto, and may be a general-purpose application which provides the home screen based on the user position information or a home screen management program installed on an operating system (OS) of the mobile communication terminal. In addition, only in the case where the user sets a pre-approval code of the application and the received signal is the signal corresponding to the application for which the user approves the provision of the home screen, the home screen may be outputted. The pre-approval of the application by the user may be set at the time of installing the application or in the middle of executing the application, and the application may be set by an integrated management means of the home screen. In addition, it may be determined whether to output the home screen based on a priority of the application.

In the case where the provision of the home screen is determined based on the received signal, the home screen can be provided at the time of activation of the mobile communication terminal. In this case, the provided home screen may be a home screen provided by the running of the application itself, or a home screen provided by the application.

For example, when a user enters a store while carrying a mobile communication terminal, a communication device installed at the store can transmit a signal to the mobile communication terminal. In the case where the mobile communication terminal outputs a home screen based on the signal, the store directly delivers information associated with the store, for example, such as coupon information, event information, new product information, etc., to the user through the mobile communication terminal so that the customized marketing can be achieved. In this case, the signal itself transmitted through the communication device may include information to be outputted to the home screen. In addition, the transmitted signal can request an approval for the output of the home screen only, and if approved, it can transmit information through a separate communication means.

If it is determined to output the home screen based on the position, the user can confirm coupon information or event information provided by the store on the home screen of the mobile communication terminal when the mobile communication terminal is activated at the store. On the contrary, if it is not determined to output the home screen, the program can proceed to another home screen or a standby screen. At this time, the provided information may be various kinds of information such as coupon, event, advertisement, etc., which are provided by the store, but is not limited thereto. In this case, the mobile communication terminal may output information on the store to the home screen through the home screen management program installed on the operating system (OS), or may be provided with the home screen through a separate home screen provision program corresponding to the communication device at the store. For example, the mobile communication terminal may be provided with the home screen through a separate application associated with the store, which is pre-installed thereon. In addition, the mobile communication terminal may be provided with the home screen through a general-purpose application for providing the home screen based on the user position information. Moreover, information can be outputted to the home screen only in the case the application falls within an application previously approved by the user through the mobile communication terminal. By virtue of this operation, only store information which the user desires can be selectively outputted to the home screen. In addition, the home screen may be provided to the mobile communication terminal through a signal transmitted from the communication device at the store, but is not limited thereto, and the presence of the mobile communication terminal may be confirmed through the signal of the communication device at the store and the home screen may be transmitted to the mobile communication terminal through a separate server.

As such, the user can be provided with different home screens depending on the position information of the mobile communication terminal, and furthermore can be provided with the home screen for only an application previously installed or approved by the user. In this case, the home screen may be provided to the entire surface of the display unit of the mobile communication terminal, but is not limited thereto, and may be partly provided to a certain region of the display unit. In addition, the home screen may be provided to a certain portion of the lock screen. The home screen provided in this embodiment may include a link tab for allowing access to additional information and a skip tab for allowing entry into a standby screen.

In accordance with this embodiment, the store provides information on the store to the home screen of the mobile communication terminal of the user so that the customized marketing can be achieved, and the user obtains information through the home screen provided when the mobile communication terminal is activated by the user so that an unwanted notice or message can be avoided. In other words, this embodiment provides a means for allowing the user to confirm information to be selectively provided, if necessary, according to the convenience of the user, but not a unilateral means for allowing the user to unconditionally confirm an arbitrary message transmitted from the communication device at the store, so that the convenience of the user can be promoted. For example, in the case where information on the store is provided to the user in the form of a push such as a notice or a message, the user may suffer from mental fatigue or stress due to unwanted notices or messages each time the user wanders about various stores. The provision of information on the store through the home screen allows the user to confirm the information through the selective activation of the mobile communication terminal, if necessary, so that unnecessary messages can be eliminated.

The communication device that grasps the position of the mobile communication terminal may be installed at the user's house, car, workplace, or the like. For example, in the case where the mobile communication terminal of the user communicates with the communication device installed at the user's house, the user may check information associated with the user's house upon the activation of the mobile communication terminal or may be provided with a home screen capable of controlling home appliances, lightings, and the like. In addition, in the case where the mobile communication terminal of the user communicates with the communication device installed at the user's car, for example, when the mobile communication terminal is activated in the vicinity of the car, the user may be provided with a home screen for controlling the unlocking of vehicle doors, the start-up of vehicle, the air conditioning of vehicle interior, or the like. Alternatively, when the mobile communication terminal is activated inside the vehicle, the user may be provided with a home screen for setting the connection with a vehicle system. In this case, the functions that can be implemented through the mobile communication terminal, for example, phone calling, messaging, application running, audio playing, etc., may be implemented through a display system, an audio system and the like, which are installed in the vehicle. In addition, when the mobile communication terminal is activated inside the vehicle, the user may be provided with a home screen for blocking functions interfering with the driving.

The selective provision of the home screen based on the position information of the mobile communication terminal in accordance with this embodiment may be made in combination with the aforementioned other control factors, i.e., whether or not the home screen data to be outputted to the display unit of the mobile communication terminal corresponds to the application installed on the mobile communication terminal, the pre-approval code of the application installed on the mobile communication terminal, and the priority of the application installed on the mobile communication terminal. The priority of the application may be determined depending on the time when the activation of the mobile communication terminal is detected. If the communication device for grasping the position information of the mobile communication terminal is present in plural numbers, the priority may be selected depending on the distance. For example, the signal of the communication device positioned at the nearest distance from the mobile communication terminal may be processed preferentially. In addition, a plurality of items of home screen information may be simultaneously displayed on the home screen outputted upon the activation of the mobile communication terminal so that the user can select his or her desired home screen information. For example, a plurality of home screens may be displayed on a single screen in a state of being divided. In this case, the plurality of home screens may be outputted in different sizes depending on priorities. In addition, in the case where it is desired to display respective home screens on the entire surface of the display unit, the home screen may be allowed to be shifted to another home screen by a left-right or up-down scroll operation, and the shift distance thereof may be controlled depending on the priorities. For example, a home screen having the highest priority may be disposed on the entire surface of the display unit, and the home screen may be shifted to home screens having lower priorities by the scroll operation.

The aforementioned embodiments of the present disclosure can be implemented in the form of a program command that can be executed through a variety of constituent components of a computer and recorded on a computer-readable recording medium. The computer-readable recording medium may include a program command, a data file, and a data structure solely or in combination. The program command recorded on the computer-readable recording medium may be a command specially designed and constructed for the present disclosure or a command publicized to or used by those skilled in a computer software field. Examples of the computer-readable recording medium include magnetic media such as a hard disk, a floppy disk and a magnetic tape; optical media such as a compact-disc read only memory (CD-ROM) and a digital versatile disc (DVD); magneto-optical media such as a floptical disk; and a hardware device specially constructed to store and execute a program command, such as a ROM, a RAM, flash memory, etc. Examples of the program command include not only a machine language code created by a compiler, but also a high-level language code executable by a computer using an interpreter or the like. The hardware device may be constructed to operate as one or more software modules in order to perform the processing according to embodiments of the present disclosure, and vice versa.

While the present disclosure has been described in connection with the embodiments illustrated in the drawings, they are merely illustrative, and the invention is not limited to these embodiments. It is to be understood that various equivalent modifications and variations of the embodiments can be made by a person having an ordinary skill in the art without departing from the spirit and scope of the present disclosure. Therefore, the true technical scope of the present disclosure should not be defined by the above-mentioned embodiments but should be defined by the appended claims and equivalents thereof.

What is claimed is:

1. A mobile communication terminal including:
   a display;
   a processor;
   a non-transitory computer-readable medium; and
   an activation button configured to receive a user's press to turn on the display, wherein the non-transitory computer-readable medium stores instructions and are executed by the processor to perform the steps of:
      turning on the display and displaying a home screen provided by an application in the mobile communication terminal in response to the user's one-time press on the activation button while the display is turned off, wherein this home screen is different from a screen provided by the application in response to the user's input in a standby screen and the home screen includes a plurality of screens provided by a separate application in the mobile communication terminal respectively, which are shiftable by left-right or up-down scrolling, with the screen of the highest priority displayed on the display without the scrolling when the mobile communication terminal is turned on in response to the one-time pressing of the user on the activation button while the display is turned off,
      wherein the home screen includes advertisement content, a skip tab to change into the standby screen of the mobile communication terminal, and a link tab to provide additional information related to the advertisement content;
      displaying a home screen management screen that includes multiple options for the user to set the home screen;
      setting a preference for an output time of the home screen, in response to the user's input to the home screen management screen, such that the home screen provided by the application is displayed only when the display is turned on in the preferred output time;
      determining a priority based on information including a usage rate of the link tab for the advertisement content, and location information on the mobile communication terminal, the location information being determined based on a signal that the mobile communication terminal receives from a communication device installed at a store, wherein the determining the priority is carried out based on a distance between the communication device and the mobile communication terminal if the mobile communication terminal receives a plurality of signals from a plurality of communication devices; and
      displaying a screen with a lower priority while the screen with the highest priority is being displayed on the display, in response to the user's motion of shifting by the left-right or up-down scrolling,
      wherein the advertisement content provided by the home screen is associated with the store where the communication device is installed, the advertisement comprising at least one selected from among coupon information, event information, and product information.

2. The mobile communication terminal according to claim 1, the steps further comprising:
   providing the home screen after a user authentication; and
   providing the home screen without a separate additional input operation after the completion of the user authentication.

3. The mobile communication terminal according to claim 1, the steps further comprising:
   providing the home screen and a user authentication simultaneously upon the one-time pressing of the activation button while the display is turned off.

4. The mobile communication terminal according to claim 1, the steps further comprising:
   displaying the plurality of screen of the home screen has a priority; and
   displaying the plurality of screen in a single screen with a different size depending on the priority.

* * * * *